United States Patent
Nagahata et al.

[11] Patent Number: 5,629,358
[45] Date of Patent: May 13, 1997

[54] PHOTOCURABLE RESIN COMPOSITION CONTAINING ACRYLATE SILANE AND EPOXY SILANE AND/OR THEIR HYDROLYSIS PRODUCTS

[75] Inventors: Masaji Nagahata, Ami; Hiroshi Masaoka, Tsukuba, both of Japan

[73] Assignee: Imperial Chemical Industries PLC, London, England

[21] Appl. No.: 995,744

[22] Filed: Dec. 22, 1992

[30] Foreign Application Priority Data

Dec. 27, 1991 [JP] Japan ................... 3-346740

[51] Int. Cl.$^6$ .............. C08L 75/16; C08L 83/07; C08F 2/48
[52] U.S. Cl. .............. 522/84; 522/96; 522/99; 522/91; 528/26; 528/28
[58] Field of Search .............. 522/99, 84, 91, 522/96; 528/26, 28

[56] References Cited

U.S. PATENT DOCUMENTS

| | | | |
|---|---|---|---|
| 4,026,826 | 5/1977 | Yoshida et al. | 260/2 S |
| 4,348,462 | 9/1982 | Chung | 522/99 |
| 4,478,876 | 10/1984 | Chung | 522/99 |
| 4,486,504 | 12/1984 | Chung | 522/99 |
| 5,128,391 | 7/1992 | Shustack | 522/91 |
| 5,221,560 | 6/1993 | Perkins et al. | 522/99 |

OTHER PUBLICATIONS

Patent Abstracts of Japan, vol. 13, No. 199 (C-594) May 1989 re JP-A1 020220.
Patent Abstracts of Japan, vol. 5, No. 102 (C-61) Jul. 1981 re JP-A 56 043 352.

*Primary Examiner*—Susan W. Berman
*Attorney, Agent, or Firm*—Cushman Darby & Cushman IP Group of Pillsbury Madison & Sutro, LLP

[57] ABSTRACT

A photocurable resin composition comprising the components (a), (b), (c) and (d) or the components (a), (b) and (e) of the following components:

(a) a polymerisable compound having at least one ethylenically unsaturated group per molecule;

(b) a photopolymerisation initiator;

(c) the hydrolysis product of at least one compound of the general Formula:

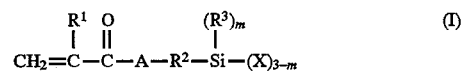

wherein $R^1$ represents a hydrogen atom or lower alkyl group, A represents —O— or —NH—, $R^2$ represents a $C_{1-6}$-alkylene group, $R^3$ represents a lower alkyl group, X represents a lower alkoxy group or halogen atom and m represents 0, 1 or 2;

(d) at least one compound of the general formula:

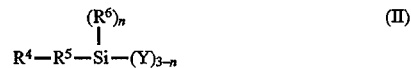

wherein $R^4$ represents a glycidoxy or $C_{5-6}$-epoxycycloalkyl group, $R^5$ represents a $C_{1-6}$-alkylene group, $R^6$ represents a lower alkyl group, Y represents a lower alkoxy group or halogen atom and n represents 0, 1 or 2, or at least one silane group-containing hydrolysis product thereof;

(e) a silane group-containing hydrolysis product of a mixture of at least one compound of Formula (I) and at least One compound of Formula (II).

9 Claims, No Drawings

PHOTOCURABLE RESIN COMPOSITION CONTAINING ACRYLATE SILANE AND EPOXY SILANE AND/OR THEIR HYDROLYSIS PRODUCTS

This invention relates to a photocurable resin composition and especially to a photocurable resin composition giving a cured material having excellent adhesion and humidity resistance.

Specifically, it relates to a photocurable resin composition which cures rapidly when irradiated with an energy beam such as an electron beam, ultraviolet radiation, visible light and the like and can give an adhesive or coating layer having high humidity resistance and excellent adhesion to a substrate, for example an inorganic material such as glass, ceramics, metal and the like, an organic material such as epoxy, acrylic, polycarbonate, polyester, polyamide, polyimide and the like or a composite material comprising these organic materials filled with an inorganic filler. More specifically, it relates to a photocurable resin composition which can be used for adhesion, encapsulation and the like of an optical communication instrument and its components and an optical information processing instrument and its components, for example a solid state camera element (MOS, CCD image sensor etc), a liquid crystal display, electronics components and the like.

It is already known to photopolymerise and into photocure a resin composition, that is to say using an energy beam such as an electron beam, ultraviolet radiation, visible light and the like and it has been used for areas such as painting, printing, adhesion, coating, resin moulding and the like.

However, when known photocurable resin compositions are used for adhesion and coating on substrates such as inorganic materials, for example metal, glass, ceramics and the like, organic materials, for example epoxy, acrylic, polycarbonate, polyester, polyamide, polyimide and the like or composite materials comprising these organic materials filled with an inorganic filler, the adhesion to these substrates is low and, in order to improve it, it has been reported to be effective to add a polar monomer such as vinyl pyrrolidone, acrylic acid, methacryloyloxy phosphate etc or to give softening to a cured resin. Unfortunately, with the cured material of these compositions, the adhesion to the substrate under high temperature and high humidity conditions deteriorates sharply.

An application of silane compounds with the object of improving adhesion to a substrate has been tried and a curable resin coating composition comprising a hydrolysis product of a silane compound as a main component has been described in Japanese Patent Disclosures 51-27886 and 51-42092 but its productivity was low because a heat treatment was required after irradiation with an energy beam in order to obtain good adhesion and a humidity resistant coating with high transparency. Moreover, since an acid or a metal salt was used as the curing catalyst, the substrate coated with the curable resin composition was susceptible to corrosion and, when the metal salt was used, the curable resin composition was coloured and therefore not suitable as an optical material.

In Japanese Patent Disclosure 64-20220, a photocurable resin composition using a silane compound having a (meth)acryloyloxy group and its hydrolysis product was described. However, the adhesion of this photocurable resin composition became insufficient under high temperature and high humidity conditions such as 90° C. and 90% relative humidity. Moreover, the performance of electronic components deteriorated when it was used for adhesion, coating or encapsulation of such parts and when it was used for adhesion or coating of an optical component, there was a deterioration in the transparency.

As described above, when known photocurable resin compositions were used for adhesion and coating on substrates such as the aforementioned inorganic, organic and composite materials, there was the problem that the adhesion was drastically reduced under high temperature and high humidity conditions. Additionally, in order to improve the humidity resistance of known photocurable resin compositions, a heat treatment became necessary and so productivity, which was a useful feature of photocurable resin compositions, was adversely affected.

It has now been found that the photocurable resin compositions hereinafter described provide excellent adhesion to the aforementioned inorganic, organic and composite substrates with no deterioration of high temperature and high humidity, the transparency of the cured material being good and the adhesion and coating agent having superior storage stability.

Thus, according to the invention, there is provided a photocurable resin composition comprising the components (a), (b), (c) and (d) or the components (a), (b) and (e) of the following components:

(a) a polymerisable compound having at least one ethylenically unsaturated group per molecule;

(b) a photopolymerisation initiator;

(c) at least one compound of the general formula:

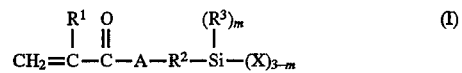

wherein $R^1$ represents hydrogen or lower alkyl, A represents —O— or —NH—, $R^2$ represents a $C_{1-6}$-alkylene group, $R^3$ represents lower alkyl, X represents lower alkoxy or halogen and m represents 0, 1 or 2, or at least one silane group-containing hydrolysis product thereof;

(d) at least one compound of the general formula:

wherein $R^4$ represents a glycidoxy or $C_{5-6}$-epoxycycloalkyl group, $R^5$ represents a $C_{1-6}$-alkylene group, $R^6$ represents lower alkyl, Y represents lower alkoxy or halogen and n represents 0, 1 or 2, or at least one silane group-containing hydrolysis product thereof;

(e) a silane group-containing hydrolysis product of a mixture of at least one compound of Formula (I) and at least one compound of Formula (II).

So far as component (a) is concerned, there is no particular limitation on the type of polymerisable compound having at least one ethylenically unsaturated group per molecule which may be used in accordance with the invention but when the purpose of the composition is improved adhesion and coating properties, (meth)acrylates and urethane (meth)acrylates containing no silane groups, such as those described below, are particularly preferred. (The expressions "(meth)acrylic acid" and "(meth)acrylate" when used herein mean, respectively, acrylic acid and/or methacrylic acid and acrylate and/or methacrylate.) Suitable (meth)acrylates and urethane (meth)acrylates include:

(i) Monofunctional (meth)acrylates: methyl (meth)acrylate, ethyl (meth)acrylate, isopropyl (meth)acrylate, hydroxyethyl (meth)acrylate, tetrahydrofurfuryl (meth)acrylate, glycidyl (meth)acrylate, p-(meth)acryloyloxybenzoic acid, benzyl (meth)acrylate, butoxyethyl (meth)acrylate, butoxytriethylene glycol (meth)

acrylate, 3-chloro-2-hydroxypropyl (meth)acrylate, cyclohexyl (meth)acrylate, bicyclopentyl (meth)acrylate, N,N-dimethylaminoethyl (meth)acrylate, ethyldiethyleneglycol (meth)acrylate, 2-ethylhexyl (meth)acrylate, glycerol (meth)acrylate, heptadecafluorodecyl (meth)acrylate, isobornyl (meth)acrylate, lauryl (meth)acrylate, 3-phenoxy-2-hydroxypropyl (meth)acrylate and the like.

(ii) Difunctional (meth)acrylates: propanediol di(meth)acrylate, butanediol di(meth)acrylate, decanediol di(meth)acrylate, ethyleneglycol di(meth)acrylate, diethyleneglycol di(meth)acrylate, propyleneglycol di(meth)acrylate, dipropyleneglycol di(meth)acrylate, glycerol di(meth)acrylate, hisphenol A di(meth)acrylate, 2,2-di(4-(meth)acryloyloxypolyethoxyphenyl)propane and the like.

(iii) Trifunctional and higher functional (meth)acrylates: trimethylolpropane tri(meth)acrylate, pentaerythritol tri(meth)acrylate, pentaerythritol tetra(meth)acrylate, tris(meth)acryloyloxyethyl isocyanurate, dipentaerythritol hexa(meth)acrylate and the like.

(iiii) Urethane (meth)acrylates: a diadduct obtained by the addition reaction of a (meth)acrylate such as 2-hydroxypropyl (meth)acrylate and 2-hydroxyethyl (meth)acrylate with a diisocyanate like hexamethylene diisocyanate and toluene diisocyanate and the like.

In addition to the above mentioned (meth)acrylic acid derivatives, any of the known commercially available derivatives may be used and mixtures of two or more of the derivatives may also be used, depending on the objective.

So far as component (b) is concerned, the photopolymerisation initiator present in the photocurable resin, composition of the invention is a photoinitiator that can be excited by an active energy beam, for example an electron beam, an ultraviolet beam, a visible light beam and the like. There is no restriction upon the photoinitiator to be used so long as it is selected appropriately considering the wavelength of the active energy beam, the desired cure rate and storage stability. Suitable photoinitiators include aromatic ketones such as benzophenone, 4,4'-bis(dimethylamino) benzophenone, 4-methoxy-4'-diethylaminobenzophenone, acetophenone, 3,3'-dimethyl-4-methoxybenzophenone, 4-chlorobenzophenone, 4,4'-diaminobenzophenone, 3,3',4, 4'tetra(t-butyl peroxycarbonyl)benzophenone, 1-hydroxycyclohexyl phenyl ketone, 2-hydroxy-2-methyl-1-phenylpropane-1-one, 1-(4-dodecylphenyl)-2-hydroxy-2-methylpropane-1-one, 2-methyl-1-[4-(methylthio)phenyl]-2-morpholinopropane-1-one and the like, substituted and unsubstituted thioxanthones such as thioxanthone, 2-chlorothioxanthone, 2-methylthioxanthone, 2,4-dimethylthioxanthone, isopropylthioxanthone, 2,4-dichlorothioxanthone and the like, α-diketones such as benzil, camphorquinone, p,p'-dimethoxybenzil, p,p'-dichlorobenzil and the like, benzoins such as benzoin, benzoin methyl ether, benzoin ethyl ether, benzoin phenylethyl ether, benzoin propyl ether, benzil dimethyl ketal, and the like, quinones such as 2-methylanthraquinone, 2-ethylanthraquinone, 2-propylanthraquinone, 2-tert-butylanthraquinone, octylmethylanthraquinone, 1,4-dimethylanthraquinone, 2,3-dimethyl anthraquinone, 2-phenylanthraquinone, 2,3-diphenylanthraquinone, 1-chloroanthraquinone, 2-chloroanthraquinone, 3-chloro-2-methylanthraquinone, 9,10-phenanthraquinone and the like, acylphosphine oxides such as 2,4,6-trimethylbenzoyldiphenyl phosphine oxide, 2,6-dimethylbenzoyldiphenyl phosphine oxide and the like, xanthone, Michler's ketone, acetophenone diethyl ketal and the like can be mentioned, but in addition to these compounds, any of the known commercially available photoinitiators can be used. The photoinitiators may be used singly or as mixtures of two or more such compounds.

The amount of photoinitiator to be incorporated can be determined in accordance with the desired cure rate, cure depth and mechanical strength of the cured product. There is no specific limitation on the amount to be incorporated but it is generally in the range of 0.01 to 15.0 parts by weight, preferably 0.1 to 5.0 parts by weight, per 100 parts by weight of photopolymerisable components ((a), (c) and (d) or (a) and (e)) present in the photocurable resin composition of the invention. In addition, in order to accelerate the cure rate of the photocurable resin composition, a thiol compound, an organic peroxide and the like can be added.

The photocurable resin composition of the invention also contains either components (c) and (d) or component (e), said components having been defined above.

As specific examples of compounds of Formula (I), 3-(meth)acryloyloxypropyltrimethoxysilane, 3-(meth)acryloyloxypropyltriethoxysilane, 3-(meth)acryloyloxypropylmethyldimethoxysilane, 3-(meth)acryloyloxypropylmethyldiethoxysilane, 3-(meth)acryloyloxypropyldimethylmethoxysilane, 3-(meth)acryloyloxypropyldimethylethoxysilane, N-(trimethoxysilyl)propyl(meth)acrylamide, N-(triethoxysilyl)propyl(meth)acrylamide, 3-(meth)acryloyloxypropyl trichlorosilane, 3-(meth)acryloyloxypropyl methyldichlorosilane, 3-(meth)acryloyloxypropyl dimethylchlorosilane and the like can be mentioned as being readily commercially available and known for industrial application but it is preferable from the aspects of stability and safety of the compositions of the invention if the hydrolysable group is a methoxy group. These compounds may be used singly or as mixtures of two or more.

As specific examples of compounds of Formula (II) 3-glycidoxypropyltrimethoxysilane, 3-glycidoxypropyltriethoxysilane, 3-glycidoxypropylmethyldimethoxysilane, 3-glycidoxypropylmethyl diethoxysilane, 3-glycidoxypropyldimethylmethoxysilane, 3-glycidoxypropyldimethylethoxysilane, β-(3,4-epoxycyclohexyl)ethyltrimethoxy silane, β-(3,4-epoxycyclohexyl)ethylmethyldimethoxysilane, β-(3,4-epoxycyclohexyl)ethylmethyldiethoxysilane, β-(3,4-epoxycyclohexyl)ethyldimethylmethoxysilane, β-(3,4-epoxycyclohexyl)ethyldimethylethoxysilane and the like can be mentioned as being readily commercially available and known for industrial application but it is preferable from the aspects of stability and safety of the compositions of the invention if the hydrolysable group is a methoxy group. These compounds may be used singly or as mixtures of two or more.

In one embodiment of the invention, the photocurable resin compositions contains a mixture of the components (c) and (d), that is to say a mixture of at least one compound of Formula (I) or a silane group-containing (co)hydrolysis reaction product thereof and at least one compound of Formula (II) or a silane group-containing (co)hydrolysis reaction product thereof, the following combinations being included.

(i) A mixture of one or more compound of Formula (I) and one or more compound of Formula (II).

(ii) A mixture of one or more compound of Formula (I) and one or more silane group-containing reaction product of the hydrolysis of a compound of Formula (II).

(iii) A mixture of one or more silane group-containing reaction product of the hydrolysis of a compound of Formula (I) and one or more compound of Formula (II).

(iv) A mixture of one or more silane group-containing reaction product of the hydrolysis of a compound of Formula (I) and one or more silane group-containing reaction product of the hydrolysis of a compound of Formula (II).

Of the aforementioned mixtures (i)–(iv), the preferred mixture is (iii). As used herein, the term "cohydrolysis" means hydrolysis of a mixture of two or more compounds and "(co)hydrolysis" includes both hydrolysis of a single compound and cohydrolysis.

Instead of a mixture of the components (c) and (d), especially instead of the aforementioned mixture (iv), the component (e) can be used.

There is no particular restriction on the reaction conditions used for the (co)hydrolysis of these compounds but generally it is suitable to add water, react at a temperature of from room temperature to 100° C. and to distil and remove reaction by-products. It is also acceptable to use an acid or an alkali to assist the hydrolysis reaction. Any known acid or alkali can be used but it is convenient to use a volatile agent such as formic acid, acetic acid, ammonia, trimethylamine, triethylamine and the like that can be removed by distillation after the hydrolysis. Additionally, a solvent which is inert to the hydrolysis reaction, such as hydrocarbons, alcohols and the like, can be used.

The hydrolysis product can also be a (co)hydrolysis reaction product of a compound of Formula (I) and/or a compound of Formula (II) and another silane compound. As examples of other silane compounds which are known for industrial application and are readily commercially available, there may be mentioned chlorosilanes such as tetrachlorosilane, trichlorosilane, dichlorosilane, methyltrichlorosilane, phenyltrichlorosilane, diphenyldichlorosilane and the like, alkoxysilanes such as tetramethoxysilane, trimethoxysilane, dimethoxysilane, methyltrimethoxysilane, dimethyldimethoxysilane, phenylmethyldimethoxysilane, trifluoropropyltrimethoxysilane, N-β(aminoethyl)-gamma-aminopropyltrimethoxysilane, N-β(aminoethyl)-gamma-aminopropylmethyldimethoxysilane, gamma-aminopropyltriethoxysilane, N-phenyl-gamma-aminopropyltrimethoxy silane, gamma-mercaptopropyltrimethoxysilane, phenyltrimethoxysilane, phenyldimethylmethoxysilane and the like.

There is no particular limitation on the ratio of the compound of Formula (I) and/or the (co)hydrolysis reaction product thereof to the compound of Formula (II) and/or the (co)hydrolysis reaction product thereof but it is typically in the range of 95:5 to 5:95 on a weight basis and preferably in a range of 70:30 to 30:70 on a weight basis. This is because sufficient adhesion to a substrate is not achieved if the usage of silane compound having a methacryloyloxy group represented by Formula (I) and/or the (co)hydrolysis product thereof is less than 5% by weight of the total silane compounds and/or (co)hydrolysis products thereof. Also, if the usage of silane compound having an epoxy group represented by Formula (II) and/or the (co)hydrolysis product thereof is less than 5% by weight of the aforementioned total weight, the required humidity resistance of the cured resin is not attained.

The total weight of compounds of Formula (I) and Formula (II) and/or (co)hydrolysis products thereof is typically from 0.5 to 70% of the resin composition of the invention on a weight basis and preferably from 1 to 30% by weight. This is because the required adhesion and humidity resistance are not achieved if the total weight of compounds of Formula (I) and Formula (II) and/or (co)hydrolysis products thereof is less than 0.5% of the weight of the resin composition whilst, if it contains more than 70% by weight, the cured resin becomes brittle and therefore unsuitable as an adhesive and coating agent.

The silane group-containing (co)hydrolysis reaction products of the compounds of Formula (I) and Formula (II) are not limited as to molecular weight, molecular structure or viscosity etc so long as they dissolve completely in component (a) to give a uniform solution and so, for example, since an insoluble solid resinous material is formed when a trifunctional silane compound, such as 3-methacryloyloxypropyltri methoxysilane and the like, is completely hydrolysed by itself, it should be made soluble in component (a) by limiting the amount of water added to effect only partial hydrolysis or by limiting the molecular weight by cohydrolysing with a monofunctional silane compound such as trimethylmethoxysilane and the like. It is also appropriate to make a partial (co)hydrolysis for the purpose of viscosity adjustment. When a silane compound (generally chlorosilanes) having a halogen atom bonded to a silicon atom is a component of the material to be hydrolysed, it is preferable not to carry out a partial hydrolysis from the aspect of safety of the resin composition. In this case, it should be made soluble by limiting the molecular weight by, for example, carrying out the cohydrolysis on a mixture of trifunctional component such as gamma-methacryloyloxypropyltrichlorosilane and monofunctional component such as gamma-methacryloyloxypropyldimethylchlorosilane.

Whilst the present invention is not to be regarded as limited by theoretical considerations, it is believed that the incorporation of compounds of Formula (I) and Formula (II) and/or (co)hydrolysis products thereof imparts improved adhesion and heat and humidity resistance to the resin composition of the invention in the following way. It is noted that the coupling effect of these silane coupling agents is particularly developed by heat treatment at about 100°–150° C. It is believed that the hydrolysable lower alkoxy groups or halogen atoms present in the silane coupling agent react with water in the atmosphere and undergo hydrolysis to silanol groups which provide adhesion at the interface with the substrate and also condense to form siloxane bonds and oligomeric products having a straight chain, branched, cyclic, network or crosslinked structure which provide the heat and humidity resistance. Accordingly, in the case of compounds of Formula (I), by using the mixture of oligomers containing silanol groups and siloxane bonds obtained by pre-hydrolysis of the silane coupling agent, the effect of that agent can be sufficiently achieved even when the resin composition is not subjected to heat treatment which is different from the general case. In the case of the compound of Formula (II), there is a possibility that hydrolysis will reduce the humidity resistance by breaking the epoxy group and therefore it is not always preferred to perform the hydrolysis.

Appropriate amounts of other additives can be incorporated in the resin compositions of the invention so long as the properties of the compositions are not adversely affected. As examples of other additives, there may be mentioned sensitisers, colouring agents such as dyes and pigments, thermal polymerisation initiators, compounds capable of photocationic polymerisation, cationic photoinitiators, polymerisation inhibitors, plasticisers, antifoaming agents, levelling agents, organic and inorganic fillers and the like.

The source of the radiation required to cure the photocurable resin composition of the invention may be a conventional source of ultraviolet radiation or visible light, for example an extra high pressure mercury lamp, a high pressure mercury lamp, a medium pressure mercury lamp, a metal halide lamp, a xenon lamp, a tungsten lamp and the like or a laser beam source, for example a helium-cadmium laser, an argon laser, a krypton laser and the like.

The invention is illustrated but not limited by the following Examples in which all parts are by weight. In the Examples, the test methods used were as follows. This viscosities quoted in the Synthesis Examples were measured at 25° C.

Initial adhesion

This test conformed to ASTM D1002. The resin composition was coated on to a test piece and adhered to another test piece comprising the same or a different substrate. The resin was cured by radiation (6000 mJ/cm$^2$) from a halogen lamp and the tension shear strength was determined.

Heat-resisting adhesion

A test piece prepared as described for the Initial adhesion test was maintained at 150° C. for 100 hours and then the tension shear strength was determined.

Humidity-resisting adhesion

A test piece prepared as described for the Initial adhesion test was maintained for 100 hours at 90° C. and 90% RH and then the tension shear strength was determined.

Corrosion resistance test

A test piece having a coating of resin composition on an aluminium plate was treated for 100 hours at 90° C. and 90% RH, and then the appearance was inspected.

Synthesis Example 1

A mixture of 50 g (0.202 mole) of gamma-methacryloyloxypropyl trimethoxysilane, 30 g of methanol, 3.64 g (0.202 mole) of distilled water and 0.1 g of acetic acid was stirred with heating and refluxed at around 64°–65° C. for 2 hours, and a hydrolysis was thus carried out. After cooling, the mixture was distilled at 70° C. and 10–20 mmHg to remove volatile components and a colourless and transparent liquid with a viscosity of 26 cP was obtained. From the IR spectrum of this hydrolysis product, it was confirmed that it contained silanol (Si—OH) groups and siloxane (—SiOSi—) bonds.

Synthesis Example 2

A mixture of 47.8 g (0.202 mole) of gamma-glycidoxypropyltri methoxysilane, 30 g of ethanol, 3.64 g (0.202 mole) of distilled water and 0.1 g of acetic acid was stirred with heating and refluxed at around 64°–65° C. for 2 hours, and a hydrolysis was thus carried out. After cooling, the mixture was distilled at 70° C. and 10–20 mmHg to remove volatile components and a colourless and transparent liquid with a viscosity of 64 cP was obtained. From the IR spectrum of this hydrolysis product, it was confirmed that it contained silanol (Si—OH) groups and siloxane (—SiOSi—) bonds.

Synthesis Example 3

A mixture of 25.1 g (0.101 mole) of gamma-methacryloyloxy propyl trimethoxysilane, 24 g (0.101 mole) of gamma-glycidoxypropyl trimethoxysilane, 30 g of methanol, 3.64 g (0.202 mole) of distilled water and 0.1 g of acetic acid was stirred with heating and was refluxed at around 64°–65° C. for 2 hours, and a hydrolysis was thus carried out. After cooling, the mixture was distilled at 70° C. and 10–20 mmHg to remove volatile components and a colourless and transparent liquid with a viscosity of 100 cP was obtained. From the IR spectrum of this hydrolysis product, it was confirmed that it contained silanol (Si—OH) groups and siloxane (—SiOSi—) bonds.

Synthesis Example 4

A mixture of 20 g (0.081 mole) of gamma-methacryloyloxy propyltrimethoxysilane, 30 g (0.121 mole) of gamma-glycidoxypropylmethyl diethoxysilane, 30 g of methanol, 2.2 g (0.121 mole) of distilled water and 0.1 g of acetic acid was stirred with heating and was refluxed at around 64°–65° C. for 2 hours, and hydrolysis was thus carried out. After cooling, the mixture was distilled at 70° C. and 10–20 mmHg to remove volatile components and a colourless and transparent liquid with a viscosity of 120 cP was obtained. From the IR spectrum of this hydrolysis product, it was confirmed that it contained silanol (Si—OH) groups and siloxane (—SiOSi—) bonds.

Synthesis Example 5

40 g (0.172 mole) of gamma-methacryloyloxypropylmethyl dimethoxysilane was dissolved in 100 ml of toluene and 30 g of dimethyldichlorosilane was slowly added dropwise maintaining the reaction temperature at 60° C. The mixture was refluxed for 1 hour after the addition, 50 g of distilled water was added dropwise, then it was again refluxed at 60° C. for 2 hours, and a hydrolysis was thus carried out. After cooling, the reaction mixture was transferred to a separating funnel and was washed with water until the aqueous layer was neutralised. After washing, the organic layer was dried with magnesium sulphate anhydride and, after filtration, it was distilled at 80° C. and 10–20 mm Hg to remove volatile components and a pale yellow liquid with a viscosity of 120 cP was obtained. From the IR spectrum of this hydrolysis product, it was confirmed that it contained silanol (Si—OH) groups and siloxane (—SiOSi—) bonds.

EXAMPLE 1

5 parts of the hydrolysis product obtained in Synthesis Example 1, 10 parts of the hydrolysis product obtained in Synthesis Example 2, and 1 part of camphorquinone and 1 part of dimethylaminoethyl methacrylate as photopolymerisation initiators were mixed and were stirred with 30 parts of Aronix M-1310 (Toa Gosei Kagaku product, a urethane acrylate) and 60 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 2

5 parts of gamma-methacryloyloxypropyltrimethoxysilane, 20 parts of the hydrolysis product obtained in Synthesis Example 2, and 1 part of camphorquinone and 1 part of dimethylaminoethyl methacrylate as photopolymerisation initiators were mixed and were stirred with 30 parts of Aronix M-1310 (see Example 1) and 50 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 3

20 parts of the hydrolysis product obtained in Synthesis Example 3, and 1 part of camphorquinone and 1 part of dimethylaminoethyl methacrylate as photopolymerisation initiators were mixed and were stirred with 30 parts of Aronix M-1310 (see Example 1) and 50 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 4

5 parts of the hydrolysis product obtained in Synthesis Example 1, 10 parts of gamma-glycidoxypropyltrimethoxysilane, and 1 part of camphorquinone and 1 part of dimethylaminoethyl methacrylate as photopolymerisation initiators were mixed and were stirred with 30 parts of Aronix M-1310 (see Example 1) and 60 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 5

5 parts of gamma-methacryloyloxypropyltrimethoxysilane and 10 parts of gamma-glycidoxypropyltrimethoxysilane, and 1 part of camphorquinone and 1 part of dimethylaminoethyl methacrylate as photopolymerisation initiators were mixed and were stirred with 30 parts of Aronix M-1310 (see Example 1) and 60 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 6

20 parts of the hydrolysis product obtained in Synthesis Example 4, and 1 part of camphorquinone and 1 part of dimethylaminoethyl methacrylate as photopolymerisation initiators were mixed and were stirred with 30 parts of Aronix M-1310 (see Example 1) and 60 parts of isobornyl acrylate, and a photocurable resin composition was obtained after deaeration. The results of the adhesion, heat resistance and humidity resistance tests for this composition determined by the aforementioned methods are shown in the Table 1.

EXAMPLE 7

10 parts of the hydrolysis product obtained in Synthesis Example 5, 15 parts of gamma-glycidoxypropyltrimethoxysilane, and 1 part of camphorquinone and 1 part of dimethylaminoethyl methacrylate as photopolymerisation initiators were mixed and were stirred with 30 parts of Aronix M-1310 (see Example 1) and 60 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 8

5 parts of the hydrolysis product obtained in Synthesis Example 1, 15 parts of β-3,4-epoxycyclohexylethyltrimethoxysilane, and 1 part of camphorquinone and 1 part of dimethylaminoethyl methacrylate as photopolymerisation initiators were mixed and were stirred with 30 parts of Aronix M-1310 (see Example 1) and 60 parts of isobornyl acrylate, and a photocurable resin composition was obtained after deaeration. The results of the adhesion, heat resistance and humidity resistance tests for this composition determined by the aforementioned methods are shown in Table 1.

EXAMPLE 9

5 parts of the hydrolysis product obtained in Synthesis Example 1, 20 parts of the hydrolysis product obtained in Synthesis Example 2, and 2 parts of Darocure 1173 (Merck product, photopolymerisation initiator) were mixed and were stirred with 30 parts of Aronix M-1310 (see Example 1) and 60 parts of isobornyl acrylate, and a photocurable resin composition was obtained after deaeration. This resin composition was coated on an aluminium plate, was cured by a 3000 mJ/cm$^2$ dose by using a high pressure mercury lamp and the corrosion resistance was evaluated by the aforementioned method. The result is shown in Table 2.

Comparative Example 1

1 part of camphorquinone and 1 part of dimethylaminoethyl methacrylate as photopolymerisation initiators were mixed and were stirred with 30 parts of Aronix M-1310 (see Example 1) and 70 parts of isobornyl acrylate, and a photocurable resin composition was obtained after deaeration. The results of the adhesion, heat resistance and humidity resistance tests for this composition determined by the aforementioned methods are shown in Table 1.

Comparative Example 2

5 parts of the hydrolysis product obtained in Synthesis Example 1, and 1 part of camphorquinone and 1 part of dimethylaminoethyl methacrylate as photopolymerisation initiators were mixed and were stirred with 30 parts of Aronix M-1310 (see Example 1) and 65 parts of isobornyl acrylate, and a photocurable resin composition was obtained after deaeration. The results of the adhesion, heat resistance and humidity resistance tests for this composition determined by the aforementioned method are shown in Table 1.

Comparative Example 3

10 parts of the hydrolysis product obtained in Synthesis Example 2, and 1 part of camphorquinone and 1 part of dimethylaminoethyl methacrylate as photopolymerisation initiators were mixed and were stirred with 30 parts of Aronix M-1310 (see Example 1) and 60 parts of isobornyl acrylate, and a photocurable resin composition was obtained after deaeration. The results of the adhesion, heat resistance and humidity resistance tests for this composition determined by the aforementioned methods are shown in Table 1.

Comparative Example 4

20 parts of gamma-glycidoxypropyltrimethoxysilane, 20 parts of gamma-methacryloyloxypropyltrimethoxysilane and 5 parts of benzene solution containing 1.0% cobalt naphthenate, and 2 parts of Darocure 1173 (Merck product, photopolymerisation initiator) were mixed and were stirred with 60 parts of triethyleneglycol dimethacrylate, and a photocurable resin composition was obtained after deaeration.

This resin composition was coated on an aluminium plate, was cured by a 3000 mJ/cm$^2$ dose by using a high pressure mercury lamp, then it was treated by heat at a temperature of 70° C., and the corrosion resistance was determined by the aforementioned method. The result is shown in Table 2.

TABLE 1

Initial, Heat resisting and Humidity resisting Adhesion Tests:
(The units are MPa)

| | Example | | | | | |
|---|---|---|---|---|---|---|
| | 1 | 2 | 3 | 4 | 5 | 6 |
| Initial adhesion | 7.5 | 6.3 | 7.2 | 7.6 | 6.5 | 6.2 |
| Heat resisting adhesion | 9.8 | 8.0 | 9.5 | 9.6 | 8.2 | 8.5 |
| Humidity resisting adhesion | 7.6 | 6.1 | 7.3 | 7.9 | 7.1 | 6.1 |

| | Example | | Comparative Example | | |
|---|---|---|---|---|---|
| | 7 | 8 | 1 | 2 | 3 |
| Initial adhesion | 6.1 | 7.8 | 8.1 | 8.4 | 7.0 |
| Heat resisting adhesion | 7.9 | 10.6 | 10.2 | 10.5 | 8.4 |
| Humidity resisting adhesion | 6.6 | 7.5 | de-laminated | de-laminated | 3.2 |

Substrate: glass plate/glass plate

TABLE 2

| | Corrosion resistance test | |
|---|---|---|
| | Example 9 | Comparative Example 4 |
| Corrosion resistance | O | X |

O: absence of corrosion, X: presence of corrosion,
Substrate: aluminium plate

As is clear from the above explanation, the photocurable resin composition of this invention has excellent adhesion to various substrates, its deterioration under high temperature and high humidity conditions is extremely small and thus it has high reliability. Therefore, the resin composition of this invention is particularly suitable for adhesion, encapsulation, etc of an optical communication instrument and its components and an optical information processing instrument and its components (for example, MOS, CCD, image sensor etc), a liquid crystal display, electronic components, etc and in addition, it can be used for surface protection of glass, plastic etc, and paint, ink and resist materials, etc.

We claim:

1. A photocurable resin composition consisting essentially of the components (a), (b), (c) and (d) or the components (a), (b) and (e) of the following components:
   (a) at least one polymerisable compound having at least one ethylenically unsaturated group per molecule that is a mixture of a urethane acrylate and a (meth)acrylate wherein the mixture contains no silane groups;
   (b) a photopolymerisation initiator;
   (c) a hydrolysis product of at least one silane group-containing compound of the general formula:

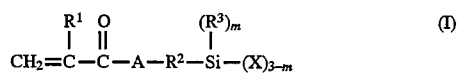

$$\begin{array}{ccc} R^1 & O & (R^3)_m \\ | & || & | \\ CH_2=C-C-A-R^2-Si-(X)_{3-m} \end{array} \quad (I)$$

wherein $R^1$ represents a hydrogen atom or lower alkyl. group, A represents —O— or —NH—, $R^2$ represents a $C_{1-6}$ alkylene group, $R^3$ represents a lower alkyl group, X represents a lower alkoxy group or halogen atom and m represents 0, 1 or 2;

(d) at least one compound of the general formula:

$$R^4-R^5-Si-(Y)_{3-n} \quad (II)$$
$$\qquad\quad | \\ \qquad (R^6)_n$$

wherein $R^4$ represents a glycidoxy or $C_{5-6}$ epoxycycloalkyl group, $R^5$ represents a $C_{1-6}$ alkylene group, $R^6$ represents a lower alkyl group, Y represents a lower alkoxy group or halogen atom and n represents 0, 1 or 2, or at least one silane group-containing hydrolysis product thereof;

(e) a silane group-containing hydrolysis product of a mixture of at least one compound of Formula (I) and at least one compound of Formula (II), and wherein said composition, after application to a substrate, is curable to form a coating on the substrate that is characterized by having improved adhesion and heat and humidity resistance.

2. A composition according to claim 1 or claim 2 wherein X is methoxy and Y is methoxy.

3. A composition according to claim 1 which contains from 0.5 to 70% by weight of components (c) and (d) or of component (e).

4. A composition according to claim 3 containing from 1 to 30% by weight of components (c) and (d) or of component (e).

5. A composition according to claim 1 wherein the weight ratio of hydrolysis product of compound of Formula (I) to compound of Formula (II) and/or (co)hydrolysis product thereof is in the range from 95:5 to 5:95.

6. A composition according to claim 5 wherein the weight ratio of hydrolysis product of compound of Formula (I) to compound of Formula (II) and/or (co)hydrolysis product thereof is in the range from 70:30 to 30:70.

7. A polymeric material which is the product of subjecting a photocurable resin composition according to claim 1 to electromagnetic radiation.

8. A composition according to claim 1 wherein component (d) is at least one silane group-containing hydrolysis product of a compound of formula (II).

9. A composition according to claim 1 wherein component (a) is a mixture of urethane acrylate and isobornyl acrylate, component (c) is a hydrolysis product of gamma-methacryloyloxypropyl-trimethoxysilane or gamma-methacryloyloxypropyl-methyldimethoxysilane, and component (d) is gamma-glycidoxypropyltrimethoxysilane or gamma-glycidoxypropylmethyldiethoxysilane or hydrolysis product thereof, and component (e) is a mixture of (1) a hydrolysis product of gamma-methacryloyloxypropyltrimethoxysilane and a hydrolysis product of gamma-glycidoxypropyltrimethoxysilane or (2) a hydrolysis product of gamma-methacryloyloxypropylmethyldimethoxysilane and a hydrolysis product of gammaglycidoxypropylmethyldiethoxysilane.

* * * * *